United States Patent [19]

Cousin et al.

[11] Patent Number: 4,643,857

[45] Date of Patent: Feb. 17, 1987

[54] RACKET FRAME

[76] Inventors: Jean-Claude Cousin, 8 Rue Abbé Bonpain, F-59117 Wervicq-Sud; Jacques A. Robin, 125 Boulevard Malesherbes, F-75017 Paris, both of France

[21] Appl. No.: 503,906

[22] Filed: Jun. 13, 1983

[30] Foreign Application Priority Data

Jun. 14, 1982 [FR] France ............................ 82 10292
Apr. 25, 1983 [FR] France ............................ 83 06724

[51] Int. Cl.⁴ .................. B29C 67/22; B29C 39/10; B29C 47/00; B29C 53/08
[52] U.S. Cl. .......................... 264/46.6; 264/148; 264/156; 264/211; 264/285; 273/73 C
[58] Field of Search ............. 264/46.6, 285, 211, 264/45.3, 156, 148; 273/73 C

[56] References Cited

U.S. PATENT DOCUMENTS

| 3,719,737 | 3/1973 | Vaillancourt et al. ......... 264/285 X |
| 3,732,345 | 5/1973 | Amos et al. ..................... 264/211 X |
| 3,917,267 | 11/1975 | McGrath ........................... 273/73 C |
| 3,981,504 | 9/1976 | Gugel .............................. 264/45.3 X |
| 3,986,716 | 10/1976 | Taussig et al. .................... 273/73 C |
| 4,297,308 | 10/1981 | Popplewell ....................... 264/46.6 |
| 4,340,226 | 7/1982 | Haines ........................... 273/73 C X |
| 4,343,757 | 8/1982 | Popplewell .................... 273/73 C X |
| 4,349,490 | 9/1982 | Bos ................................ 264/285 X |
| 4,365,806 | 12/1982 | Reid et al. ....................... 273/73 C |
| 4,440,712 | 4/1984 | Imgram ........................... 264/285 X |

FOREIGN PATENT DOCUMENTS

| 39377 | 11/1981 | European Pat. Off. ........... 264/285 |
| 543033 | 3/1956 | Italy .................................... 264/285 |
| 726642 | 12/1966 | Italy .................................... 264/285 |
| 52-21934 | 2/1977 | Japan ................................ 273/73 C |
| 52-36168 | 3/1977 | Japan .................................... 264/285 |

OTHER PUBLICATIONS

Brydson, J. A., *Plastics Materials*, Princeton, N.J., D. Van Nostrand, ©1966, pp. 296-298, 307, 308.
*Hackh's Chemical Dictionary*, fourth edition, completely revised and edited by Julius Grant, New York, McGraw-Hill, ©1972, p. 467.

Primary Examiner—Philip Anderson
Attorney, Agent, or Firm—Guy W. Shoup

[57] ABSTRACT

A racket frame is formed from an elongate element produced by extrusion of a mixture of a thermoplastic material and carbon fibres. The element is bent while hot to form the racket head and has arms which are joined together by throat pieces, thereby forming the racket shaft. The throat pieces are formed by injection moulding. The elongate element preferably has at least one cavity extending along its length, the cavity being filled with foamed material of a density different from that of the elongate element so that the racket can have the desired weight. Preferably ropes of carbon fibres are included in the elongate element extending along its length. The aligned fibres give strength to the frame. In production of the frame the thermoplastic material may be extruded, cooled, have holes for strings formed in it, and then bent to shape or may be bent to shape immediately upon extrusion.

5 Claims, 13 Drawing Figures

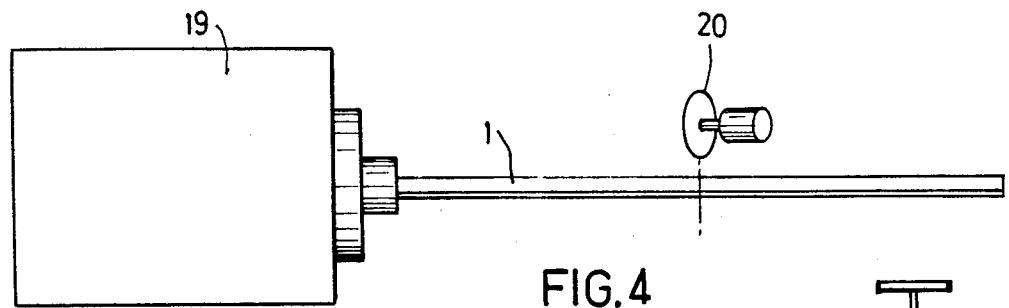
FIG.4
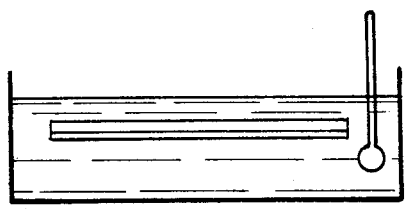
FIG.7
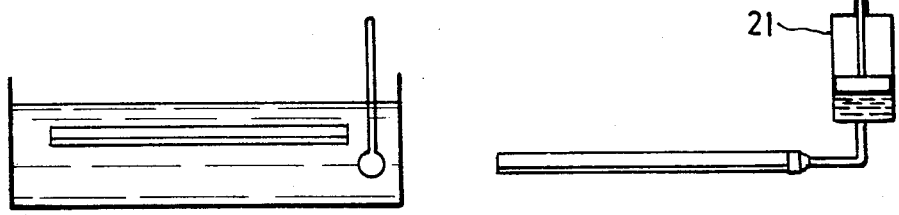
FIG.6
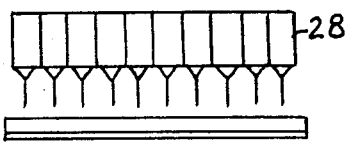
FIG.5
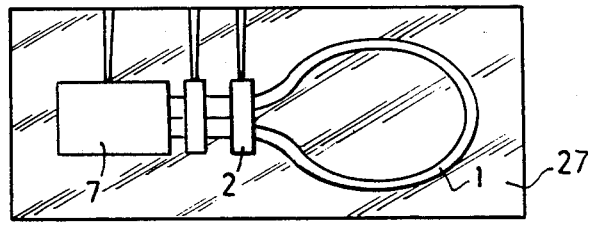
FIG.8
FIG.9
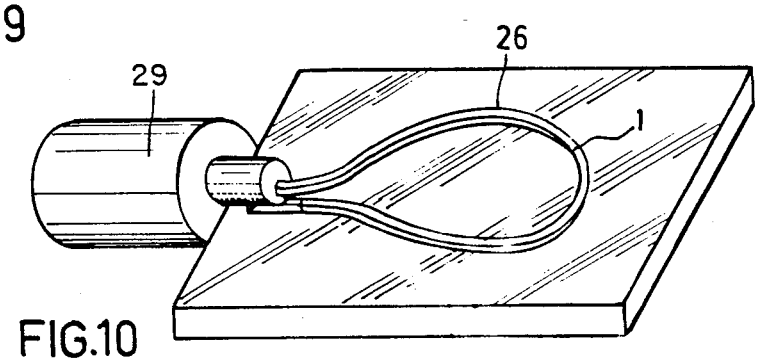
FIG.10

RACKET FRAME

FIELD OF THE INVENTION

The present invention relates to a racket frame suitable for making a racket for e.g. tennis, badminton or similar games, and to a method of manufacturing such a racket frame.

BACKGROUND OF THE INVENTION

The design of tennis rackets, which stood still for fifty years, has been developing rapidly in the last ten years. The spread of tennis, the greater number of players and the higher quality of those players, have led to problems with equipment. These problems have been aggravated by the transfer of the production of rackets to countries with low labour force costs and by the general use of new forms of frame allowed by the absence of regulations.

The undustrialisation of the manufacture of wooden rackets means that there is now a less careful selection of the tree trunks used, natural drying has been replaced by steam drying, wood peeling has come into use instead of assembling leaves of wood cut in the direction of the grain, and the result is a lower performance from the rackets produced. Gluing, machining and drilling by semi-automatic methods cannot achieve a quality equal to the quality attainable by craftsmen.

The known idea of a frame made from a metal element bent to a curved portion forming the racket head and two arms forming the racket shaft is reliable only if tempered steel is used with a brazed join between the arms. However, when using a racket having such a frame it is necessary to centre the ball perfectly or vibrations are set up which are prejudicial to the player. Such a metal frame is therefore thought applicable only to average-quality frames.

"Sandwich" structures with a lining parallel to the stringing plane and used on a plastic neutral fibre or as reinforcement for a wooden structure are subjected to shearing stress owing to the dynamic or static stresses of the stringing. They improve the bending strength of the frames but present adhesion problems. The cutting-out of impregnated fabrics does not permit suitable orienting of the fibres and results in prohibitive loss of material. The possible improvement of linings cannot eliminate the problems of the shearing stress. Reinforcements made of metal or laminate material perpendicular to the stringing plane are not of significant value because of the necessary perforations for the strings and the usually central positioning of these reinforcements.

It is also known to mould racket frames from continuous glass fibres or carbon fibres impregnated with thermosetting epoxy resins. However, such methods involve a long production process and hence a considerable cost. Rackets with suitably oriented fibres are reserved for the elite.

The employment of thermoplastic materials which may be processed rapidly makes it possible to reduce the number of operations required for the production of a frame. The choice of the quality and the addition of cut fibres makes it possible to obtain an anisotropic material of high modulus of elasticity endowed with excellent return characteristics. Polyamides with carbon fibres as filler, forming a mixture, are used:

with simple injection moulding: here the density of the mixture makes it necessary to reduce the cross-sections of the frame, hence there is a diminishing of the moment of inertia of the frame;

with injection moulding of a mixture lightened by a swelling agent (U.S. Pat. No. 3,981,504 assigned to P.P.G. Industries): here the loss in bending properties is not made up for by the increase in cross-sections that can be achieved;

with injection moulding on to a fusible core (U.S. Pat. No. 4,297,308 assigned to Dunlop): this affords the advantage of a hollow structure with central reinforcements and an integral join between arms, but requires an extremely complex production process for its manufacture;

with assembly of injection moulded elements resulting in a continuous internal rib (U.S. Pat. No. 4,194,738 assigned to Hitachi).

The use of injection moulding normally limits the amount of carbon admixed in the mixture which inhibits exploiting all the properties of the material. During injection moulding a sheath of thermoplastic material in contact with the mould modifies the distribution of the fibres and the characteristics of the mixture. The injection pressure and the movement of the mixture through passages of small cross-section causes fracture of the fibres, such that their residual length does not allow the theoretical characteristics of the mixture to be maintained. The shape and dimensions of the frame require material flow welding, and at the head of the racket a local loss of strength is also observed between the perforations. Despite these disadvantages which, added to design faults, result in a racket with inadequate rigidity, solid-section rackets injection moulded from non-lightened materials have excellent return characteristics, confirming the usefulness of the material.

SUMMARY OF THE PRESENT INVENTION

According to the present invention a racket frame for tennis, badminton or other games played with a racket has an elongate element of at least one thermoplastic material shaped by hot bending, the throat piece or pieces and the handle being moulded on by injection moulding. The elongate element is bent into a curved portion which forms the racket head and two arms forming the shaft of the racket. The throat piece(s) secure the arms together.

Fibres are mixed in with the thermoplastic material and are aligned in the finished frame to give high strength. To achieve the alignment of the fibres the mixture of fibres and thermoplastic material is preferably extruded as this prevents excessive turbulence which causes fracture of the fibres. Alternatively, or in addition to mixing fibres with the thermosplastic material, individual fibres or ropes of fibres may be incorporated into the elongate element during the formation of that element. The ropes preferably extend the full length of the element.

The elongate element preferably has longitudinal compartments which are filled with a polyurethane foam of a different density to the elongate element. In this way a frame of a desired weight can be achieved. The foam also may protect the elongate element against being crushed when being bent.

The elongate element is preferably made by the extrusion of a thermoplastic compound such as nylon of 11, 12 or 612 type with low water absorption, polyurethane, or an acetal resin, in which carbon fibres are incorporated. The length of the fibres is preferably greater than 1 mm and advantageously of the order of 5 to 6 mm, of the high-strength type.

The use of extrusion, as opposed to injection, makes it possible to retain uniform orientation and length of the fibres within the frame and thus to make use of the full range of the properties of the fibres.

BRIEF DESCRIPTION OF THE DRAWINGS

Embodiments of the invention will now be described in detail, by way of example, with reference to the accompanying drawings, in which:

FIGS. 4 to 9 show various stages in a manufacturing process of a racket frame according to the present invention;

FIG. 10 shows an alternative production method;

DETAILED DESCRIPTION OF EMBODIMENTS OF THE INVENTION

Figure 1:
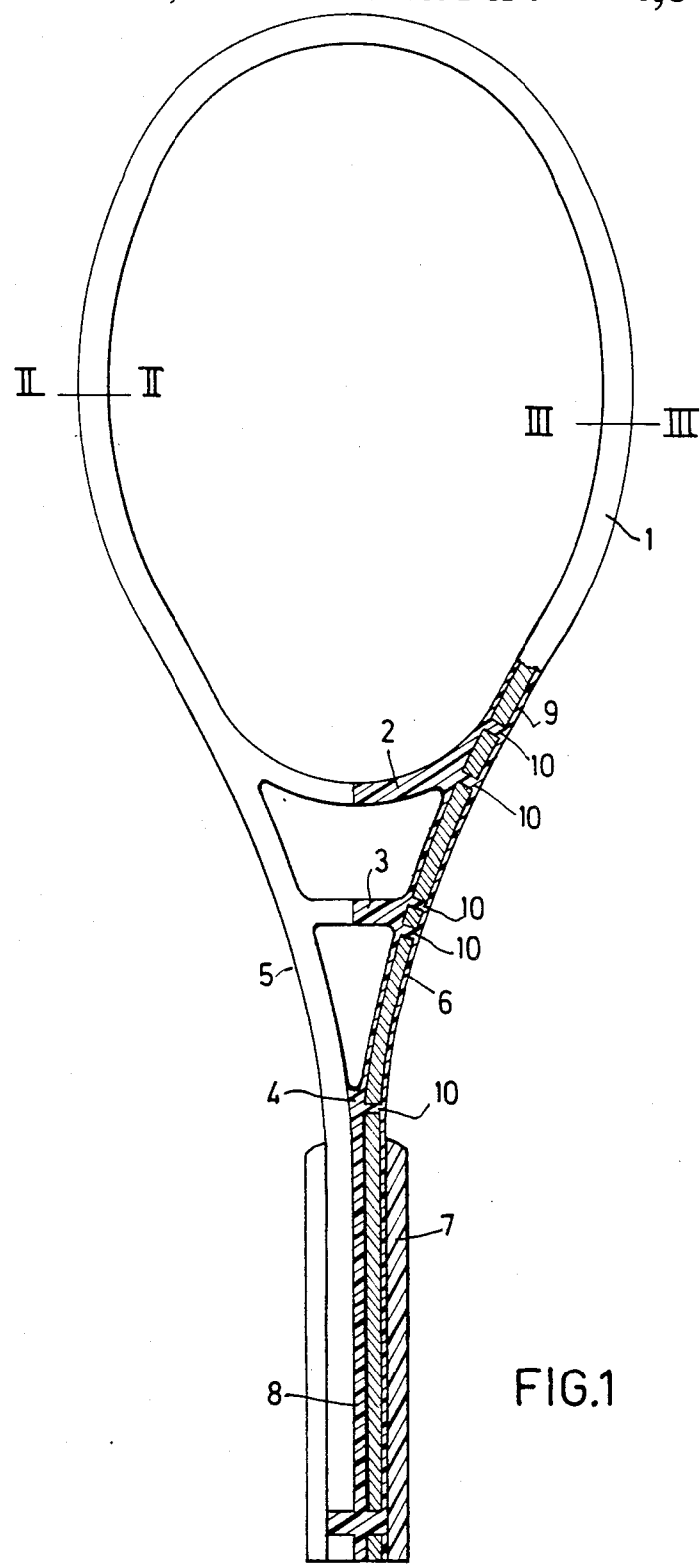
FIG. 1 shows an embodiment of a racket frame according to the invention.

In FIG. 1 a preferred embodiment of a racket frame 1 according to the present invention has a generally oval shape, symmetrical relative to its longitudinal axis but asymmetrical with respect to its transverse axis. It comprises an elongate member shaped so as to form two arms 5 and 6 connected at their lower portion by struts 2 and 3 and by a weld 4. The struts 2 and 3 will be referred to hereinafter as throat pieces. A slot 8 is formed below the weld 4 and is subsequently filled with polyurethane. The two ends of the arms 5 and 6 are enclosed within a handle 7 moulded onto the arms 5 and 6 by injection moulding. The elongate element is shaped whilst hot by bending it to the desired form. The struts 2,3 are preferably formed by injection of a nylon of 11, 12 or 612 type similar to that of the elongate element of the frame, but a nylon 66, a polyurethane, or an acetal resin may be used.

The material injected to form the struts 2 and 3 preferably extends in a layer 9 on all sides of the frame and extends through bores 10 in the elongate element thereby to form plastic rivets, injection being effected through the bores 10. Thus, the two arms 5,6 are integrally joined, and there is no risk of them coming apart even under the most violent forces, there being maximum torsional strength.

Figure 2:
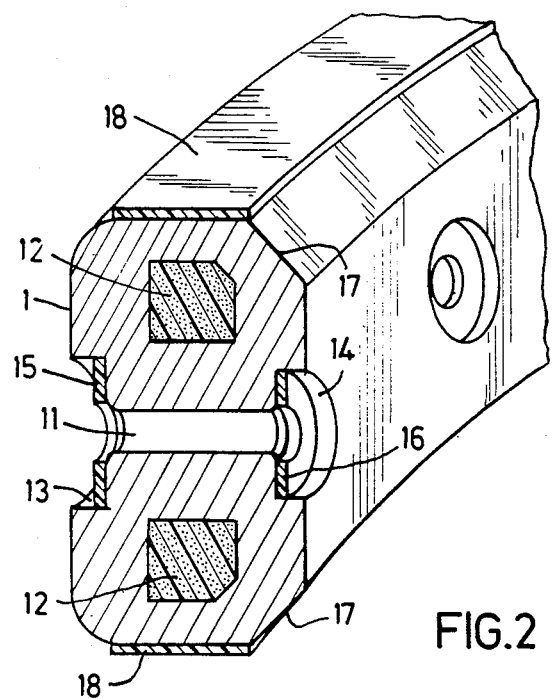
FIG. 2 shows a first alternative of the cross-section of the frame along the line II—II in FIG. 1.

FIG. 2 shows a section taken on the line II—II of FIG. 1 and shows the structure of the elongate element forming the frame 1. This elongate element consists of a mixture of carbon fibres and nylon of 11, 12 or 612 type. In order to obtain an overall density of the frame 1 of the order of about 0.9 it is possible to introduce into the mixture hollow ballshaped microbeads made of glass such as those known under the name of "Filite" (trade mark). During extrusion, two longitudinal cavities 12 are formed within the elongate element. These two cavities are later filled with a polyurethane foam whose density is chosen in dependence on the final weight the racket is to have. This foam also prevents crushing of the elongate element during bending. The location of the sectional view shows a hole 11 through which a string (not shown) of the racket is to pass. Preferably there are seventy holes 11 through which the racket strings are to pass for a medium-mesh racket and a single string passes through each hole. Although this causes a slight increase in the number of holes over a standard racket (70 as against 64), it makes it possible to reduce the diameter of the holes 11 and consequently to increase the total strength of the racket. The edges of the holes 11 are bevelled at 13, at the outer side of the frame 1 and at 14 on the inner side, so that the strings do not press against sharp corners which could damage them. It will be noted that when the frame is made of polyamide it is not necessary to provide special protection for the strings. Strips 15 or 16 can be extruded simultaneously with the elongate element, with the object of ensuring better stability of the elongate element during extrusion. Where appropriate they may be used for adjusting the weight of the racket or may form a decoration. It is also possible simultaneously to extrude, at the periphery of the frame, bands 18 which provide decoration and support for the elongate element. As can be seen from FIG. 2 the frame has a cutaway 17 at its inner corners. It has been found that this portion of the frame makes no contribution to the bending and torsional strength of the racket after stringing, and thus by forming the cutaways 17 the overall weight can be reduced by several grams.

Figure 3:
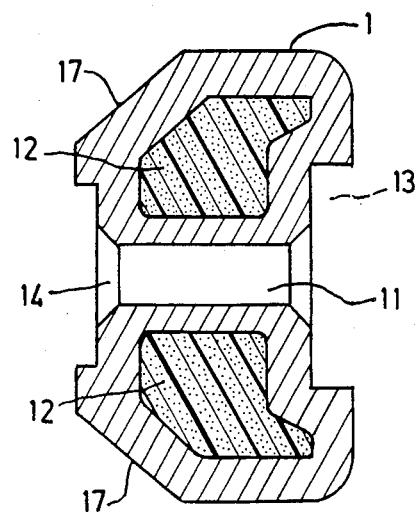
FIG. 3 shows a second alternative cross-section of the frame along the line III—III in FIG. 1.

FIG. 3 shows an alternative cross-sectional construction of the elongate element which is a section taken on the line III—III of FIG. 1. The same reference numerals designate the same parts as in FIG. 2. The optional bands and strips have been omitted. In this alternative the cavities 12 are of a different shape to those in FIG. 2.

FIGS. 4 to 9 show diagrammatically the various stages of a method for manufacturing one embodiment of a racket frame according to the present invention.

In FIG. 4 a mixture of carbon fibres and polyamide is introduced into the interior of an extruder 19 of conventional type. The polyamide is melted in the extruder 19 and is pushed through a die to form an element 1 of the type shown in section in FIG. 2 or 3. The elongate element is then cut by a saw 20 into lengths suitable for forming a racket frame. The lengths are then pierced whilst straight (FIG. 5) to form the holes 11 for the strings and the bores 10 and a polyurethane foam is introduced by a press 21 (FIG. 6) into the cavities 12 in which the foam expands. These operations are carried out when the elongate element 1 has cooled and is solid. In order to carry out hot bending of the elongate element 1, the element has to be heated to its softening temperature. This may be achieved, as shown in FIG. 7, by immersing the length of extrusion in a thermostat-controlled bath for example of silicone oil, or by any other means.

FIG. 8 shows diagrammatically the bending of the elongate element 1. The element is introduced into a bending machine comprising two arms 23 and 24 extending in opposite directions and pivotably connected to one another about a pivot 25 situated adjacent a core 22 which reproduces the desired internal contour of the frame. The arms 23 and 24 are rotated about the pivot 25 so they swing about the core 22. The drills or perforators of course are spaced (FIG. 5) such that, after bending, the holes 11 are distributed uniformly around the periphery of the frame.

FIG. 9 shows in a diagrammatic manner successive injection operations. The first injection forms the throat pieces 2,3 of the racket in the form of parallel struts and weld 4 (FIG. 1). The throat pieces 2,3 are moulded between the arms 5 and 6 by injection into a mould 27 of a polyamide resin such as a 6—6 polyamide resin, for example. This polyamide has a higher melting point than the nylon of 11 or 12 or 612 type used to form the elongate element. Therefore, the injection of this polyamide causes a superficial softening or fusion of the arms 5 and 6 adjacent the injected material, which is advantageous for good bonding. The connection is completed by the formation of plastic rivets through the bores 10 which are injected simultaneously with the formation of the throat pieces 2,3. The plastic rivets have the advantage over screws which are currently in use in prior act constructions in that they do not detach from the parts which they unite. The arms 5 and 6 are also made integral with one another at their lower end by an additional part formed by injection of a polyurethane foam between the arms. In the course of this same operation the handle 7 is made by direct-skin injection of polyurethane foam. The two arms are thus made integral by adhesion, which obviates vibrations and improves torsional rigidity.

Carbon fibres of high strength type are cut to lengths of 5 to 6 mm and mixed to a concentration by weight of 15% with the basic thermoplastic. The operations of mixing and extrusion are such that the residual length of the fibres is greater than 1 millimeter. Preferably carbon fibres are used because of their high modulus of elasticity. For less high performance rackets it is possible to use a mixture of glass fibres and carbon fibres at a total concentration of more than 15% by weight.

The components of the mixture may be thoroughly mixed in an extruder which delivers granular particles. It is these particles which are extruded again to give an elongate element. However, the elongate element is preferably extruded directly from the mixture. Thus the carbon and/or glass boron, aramld fibres and the polyamide or any other suitable thermoplastic material such as certain grades of polyurethanes, polycarbonates or polyacetals, (provided however that the strength of the thermoplastic material is adequate when under stress) are introduced into the extruder. The mixture is then produced directly in the extruder and extruded to form the elongate element in a single operation. This method enables the carbon fibres to retain a greater length. As has been mentioned above, the preferential choice of nylon of 11 or 12 or 612 type is due to the criterion of low water absorption. Other thermoplastic materials, however, have the advantage of having larger softening ranges than those of the aforesaid polyamides.

An alternative production method is shown in FIG. 10. It is based on the idea that it is possible to shape the frame directly at the outlet of the extruder, when the elongate element is still soft. For this purpose a mould having a groove 26 with a cross-section the same as that the frame is to have is arranged at the outlet of the die of the extruder 29. This groove 26 guides the elongate element as it issues from the extruder. The disadvantage of this second method, however, is that it is necessary to pierce the holes 11 after cooling the frame, when the frame has adopted its final form. This is difficult once the frame has been given its final shape. Therefore the first method described previously is preferred. After the bending of the elongate element a second plate is brought to in front of the extruder and a new extrusion and bending operation is carried out. The groove 26 may of course be heated and lubricated.

The present invention makes it possible to produce tennis racket frames whose modulus of elasticity is of the order of 15,000. For average-mesh rackets, the total weight after stringing may vary by ten grams intervals from 365 to 395 grams, the weight of the elongate element alone being approximately 270 grams. As has been stated above, this weight may be varied in accordance with the desired characteristics of the racket either by the introduction of hollow ball-shaped microbeads of glass or aluminium silicate into the compound, or by suitable choice of density of the polyurethane foam introduced into the grooves 12, or by appropriate choice of the density and the dimensions of the bands 15, 16 or 18.

Although in the examples which have been given above the elongate element is obtained by extrusion of a mixture of thermoplastic and fibres this feature is not essential. The invention seeks to retain as great a fibre length as possible. Thus, the elongate element may also be produced by injection moulding, injection being followed by hot bending. In fact injection of an elongate element to form the frame does not have the disadvantage of causing rupture of the fibres nor the formation of heterogeneous concentrations of these fibres such as occur when injecting directly into a mould. In some cases it is not always possible to control both the length of the carbon fibres after extrusion and also the distribution of these fibres within the volume of the racket frame. Completely impregnated continuous fibres give better results under tensile and bending stresses. The compound produced cannot satisfactorily impregnate ropes of carbon fibre. As a result such ropes, without preliminary impregnation, remain dry so that they give substantially no strengthening effect. On the other hand it is highly advantageous from the point of view of mechanical strength of the frame to include in the frame at least two carbon fibre braids or ropes which extend over the entire length of the frame. Preferably, the cross-section of the frame being substantially rectangular, a rope of carbon fibres is arranged in each of the corners of the rectangle. Thus the continuity of the ropes is not affected when piercing the necessary holes for the strings to pass through. It will be noted that by using a square head it is possible to arrange the ropes in a suitable manner geometrically, whereas in the processes using moulding it is not possible to control the positions of such ropes.

Figure 11:
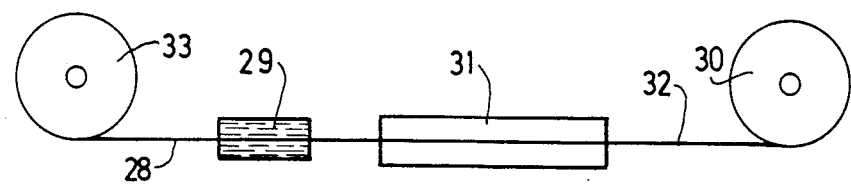
FIG. 11 illustrates diagrammatically impregnation of a robe of carbon fibres.

In FIG. 11 ropes 28 of fibres of carbon or of any other material having similar properties capable of being impregnated are unwound from a reel 33 and pass into a bath 29 containing a solution of a thermoplastic material such as a polyamide resin or polyurethane in one or more solvents. Of course the choice of this material depends on the characteristics of the thermoplastic material. On issuing from the bath the solvent(s) of the thermoplastic material are evaporated in a stove 31 and the impregnated ropes of fibres 32 are wound for example on to a take-up reel 30 of sufficient radius to avoid breaking the ropes 28.

Figure 12:
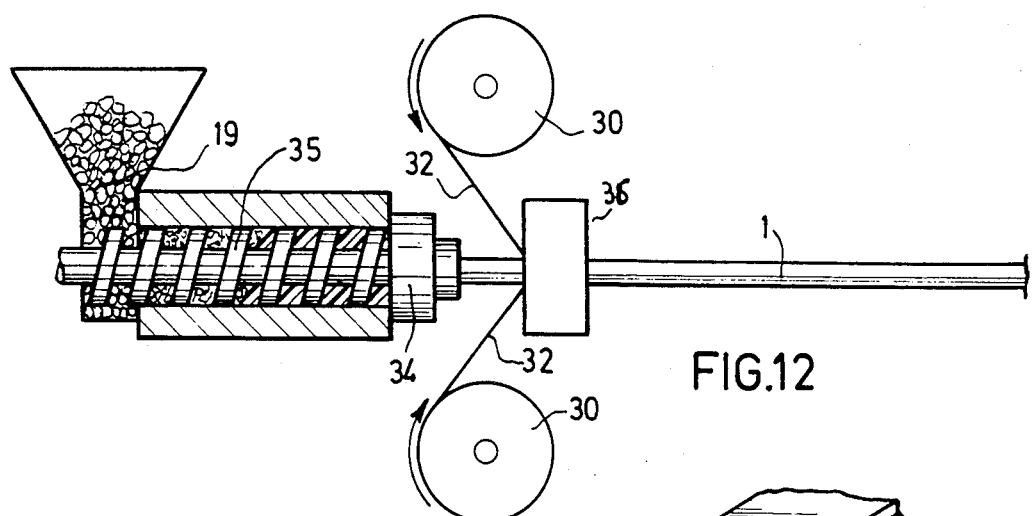
FIG. 12 is a view showing diagrammatically the simultaneous extrusion of the thermoplastic material and fibre ropes.

FIG. 12 shows diagrammatically an extruder 19 including a conveying screw 35 forcing thermoplastic material in a melted state into a die 34.

The compound is introduced in a granular state into the extruder 19 where it is melted and directed towards the die 34. Whilst the extruded material is still soft two or more impregnated ropes 32, are introduced into a second heating die 36 simultaneously with the extruded elongate element. The heating action causes the substance impregnating the carbon fibres to fuse slightly, which allows it to become perfectly integrated into the elongate element. Preferably the assembly comprising thermoplastic material and fibres is subjected to pultrusion as described in French Pat. No. 82.10292 which ensures perfect positioning of the ropes 32.

Figure 13:
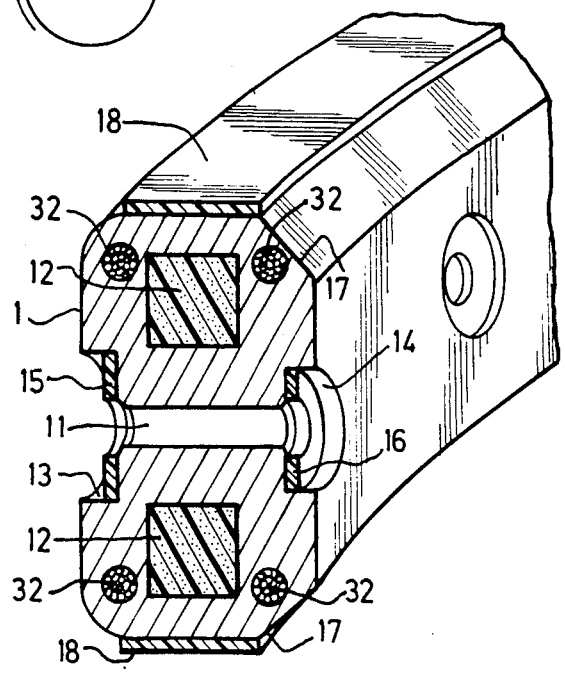
FIG. 13 shows a third alternative of the cross-section of a frame according to the present invention.

FIG. 13 shows a section through another embodiment of a frame according to the present invention after bending. It is similar to the frame of FIG. 2 but four ropes of carbon or other fibres are provided at the four corners of the cross-section, the fibres extending over the entire length of the frame.

It will be apparent that many variants may be introduced more particularly by substitution of equivalent technical means without thereby departing from the scope of the present invention, which is not limited to tennis rackets only but is also applicable to rackets for squash, badminton, etc.

What is claimed is:

1. A method of manufacturing a racket frame, comprising:
   forming a mixture of at least one thermoplastic material and a plurality of fibres;
   extruding said mixture to form an elongate element and simultaneously forming at least one elongate cavity in said elongate element;
   allowing said elongate element to cool:
   cutting said elongate element to a predetermined length and forming a plurality of holes along said elongate element;
   filling said at least one elongate cavity with foam;
   heating said elongate element to a temperature sufficient to render soft said elongate element;
   bending said heated elongate element to form a racket frame element having head and shaft portions;
   injection moulding at least one throat piece around a first shaft portion of said racket frame element; and
   forming a handle for such frame around a second shaft portion of said frame element.

2. A method of manufacturing a racket frame, comprising:
   forming a mixture of at least one thermoplastic material and a plurality of fibres;
   injection moulding said mixture to form an elongate element and simultaneously forming at least one elongate cavity in said elongate element;
   forming a plurality of holes along said elongate element;
   filling said at least one elongate cavity with foam;
   heating said elongate element to a temperature sufficient to render soft said elongate element;
   bending said elongate element to form a racket frame element having head and shaft portions;
   injection moulding at least one throat piece around a first shaft portion of said elongate element; and
   forming a handle for said frame around a second shaft portion of said frame element.

3. A method of manufacturing a racket frame comprising:
   forming a mixture of at least one thermoplastic material and a plurality of fibers;
   extruding said mixture through a die to form an elongated element;
   piercing a set of holes in the elongated element;
   forming from said elongated element a shaped racket frame element having head and shaft portions by bending the same;
   forming at least one throat element around a first shaft portion of said frame; and
   forming a handle around a second shaft portion of the frame element.

4. A method of manufacturing a racket frame according to claim 3, wherein said thermoplastic material is a nylon resin, and said fibers are carbon fibers.

5. A method of manufacturing a racket frame comprising:
   forming a mixture that includes at least one thermoplastic material;
   extruding said mixture to form an elongate element and simultaneously forming at least two elongate cavities in said elongate element;
   allowing said element to cool;
   filling said at least two elongate cavities with a foamable resin and permitting the resin to foam;
   cutting said elongate element to a predetermined length and forming a plurality of transverse holes along said elongate element;
   heating said elongate element to a temperature to render soft said elongate element and bending said elongate element to form a racket frame element having a head and shaft portion;
   injection molding at least one throat piece around a first shaft portion of said frame element; and
   forming a handle for the frame around a second shaft portion of the frame element.

* * * * *